United States Patent
Inuma et al.

(10) Patent No.: US 11,932,393 B2
(45) Date of Patent: Mar. 19, 2024

(54) UNMANNED AERIAL DEVICE, LOAD-LOWERING DEVICE, AND LOAD TRANSPORT METHOD

(71) Applicant: RAKUTEN GROUP, INC., Tokyo (JP)

(72) Inventors: Takayoshi Inuma, Tokyo (JP); Kenichi Lee, Tokyo (JP); Nobuyuki Miyake, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 348 days.

(21) Appl. No.: 17/419,051

(22) PCT Filed: Sep. 3, 2019

(86) PCT No.: PCT/JP2019/034651
§ 371 (c)(1),
(2) Date: Jun. 28, 2021

(87) PCT Pub. No.: WO2021/044528
PCT Pub. Date: Mar. 11, 2021

(65) Prior Publication Data
US 2022/0081112 A1   Mar. 17, 2022

(51) Int. Cl.
*B64C 39/02* (2023.01)
*B64D 1/12* (2006.01)
(Continued)

(52) U.S. Cl.
CPC .............. *B64C 39/024* (2013.01); *B64D 1/12* (2013.01); *B66D 1/525* (2013.01); *B64U 10/13* (2023.01); *B64U 2101/60* (2023.01)

(58) Field of Classification Search
CPC .......... B64C 39/024; B64D 1/12; B64D 1/22; B66D 1/525; B66D 1/12; B66D 1/60;
(Continued)

(56) References Cited

U.S. PATENT DOCUMENTS 2,410,451 A * 11/1946 Landry .................... B64D 1/22
                                                          258/1.2
2,695,086 A * 11/1954 Parker .................... B66D 1/12
                                                          310/98
(Continued)

FOREIGN PATENT DOCUMENTS

JP      59-033857 U      3/1984
JP      2016-088675 A    5/2016
(Continued)

OTHER PUBLICATIONS

International Search Report for PCT/JP2019/034651 dated Oct. 8, 2019 [PC/ISA/210].
(Continued)

*Primary Examiner* — Medhat Badawi
(74) *Attorney, Agent, or Firm* — Sughrue Mion, PLLC

(57) ABSTRACT

An unmanned aerial device according to an aspect of the present invention includes an aerial device body capable of flying in an unmanned manner, and a load-lowering device mounted to the aerial device body and configured to lower a load from the aerial device body. The load-lowering device has a linear member holder for holding a linear member having one end portion connectable to the load, the linear member holder holding at least the other end portion of the linear member, and a speed limiting mechanism that limits a speed at which the linear member is pulled out of the linear member holder, under a weight of the load.

11 Claims, 5 Drawing Sheets

(51) Int. Cl.
*B66D 1/52* (2006.01)
*B64U 10/13* (2023.01)
*B64U 101/60* (2023.01)

(58) Field of Classification Search
CPC ...... B66D 1/40; B64U 10/13; B64U 2101/60; B64U 2101/67
See application file for complete search history.

(56) References Cited

U.S. PATENT DOCUMENTS

| | | | | |
|---|---|---|---|---|
| 2,881,882 | A * | 4/1959 | Gentile | B66C 13/26 254/296 |
| 5,018,603 | A * | 5/1991 | Ito | B66B 11/0438 254/362 |
| 5,244,060 | A * | 9/1993 | Tanaka | F16D 49/16 187/261 |
| 6,851,520 | B2 * | 2/2005 | Nagata | B66B 11/0438 187/373 |
| 9,205,922 | B1 * | 12/2015 | Bouwer | G05D 1/0858 |
| 9,580,173 | B1 * | 2/2017 | Burgess | B64D 1/22 |
| 9,783,297 | B2 * | 10/2017 | Patrick | B64D 1/22 |
| 9,969,494 | B1 * | 5/2018 | Buchmueller | B64D 1/12 |
| 10,000,285 | B2 * | 6/2018 | Shannon | B66D 1/60 |
| 11,312,492 | B1 * | 4/2022 | von Flotow | B64U 10/13 |
| 2016/0236778 | A1 * | 8/2016 | Takayama | B64D 47/06 |
| 2017/0362067 | A1 * | 12/2017 | Hiekata | B66D 1/12 |
| 2018/0072417 | A1 * | 3/2018 | Shannon | B64C 39/024 |
| 2018/0072419 | A1 * | 3/2018 | Burgess | G05D 1/042 |
| 2018/0244509 | A1 * | 8/2018 | Curran | B64D 1/22 |
| 2018/0312247 | A1 * | 11/2018 | Ichihara | B64D 47/00 |
| 2020/0132521 | A1 * | 4/2020 | Akiba | G01D 11/26 |
| 2020/0140245 | A1 * | 5/2020 | Yasuda | B64U 10/13 |
| 2020/0307972 | A1 * | 10/2020 | Maghoodi | F16D 59/00 |
| 2021/0039927 | A1 * | 2/2021 | Maghsoodi | H02K 9/06 |
| 2021/0214082 | A1 * | 7/2021 | Inuma | B64D 9/00 |
| 2021/0323658 | A1 * | 10/2021 | Welsh | F16F 15/30 |
| 2022/0081112 | A1 * | 3/2022 | Inuma | B66D 1/525 |
| 2022/0129826 | A1 * | 4/2022 | Rakshit | G06Q 10/20 |
| 2022/0250768 | A1 * | 8/2022 | Oshima | B61B 13/00 |
| 2022/0274706 | A1 * | 9/2022 | Suzuki | B64U 10/14 |
| 2023/0072458 | A1 * | 3/2023 | Säkkinen | B66C 13/22 |

FOREIGN PATENT DOCUMENTS

| | | |
|---|---|---|
| JP | 2019-085104 A | 6/2019 |
| WO | 2017/078118 A1 | 5/2017 |

OTHER PUBLICATIONS

Written Opinion for PCT/JP2019/034651 dated Oct. 8, 2019 [PCT/ISA/237].

* cited by examiner

UNMANNED AERIAL DEVICE, LOAD-LOWERING DEVICE, AND LOAD TRANSPORT METHOD

CROSS REFERENCE TO RELATED APPLICATIONS

This application is a National Stage of International Application No. PCT/JP2019/034651 filed Sep. 3, 2019.

TECHNICAL FIELD

The present invention relates to an unmanned aerial device, a load-lowering device, and a load transport method.

BACKGROUND ART

It has been under consideration to use an aerial device that can fly in an unmanned manner, such as the so-called drone, to transport a load. Specifically, such an aerial device is provided with a box or the like for accommodating a load, and the load is delivered to an addressee while the box is opened in a state where the aerial device is on the ground. In this case, a flat place having at least a certain area that allows the aerial device to land is required as a place for delivering the load. In addition, at the time of landing, the aerial device tends to become unstable, and is likely to be subjected to interference by a third party.

To address the foregoing problems, delivery methods disclosed in, for example, Patent Documents 1 and 2 cited below have been considered. The delivery methods use an aerial device equipped with a winding machine (winch) that can wind and unwind a linear member (e.g., a wire or a string) holding a load at its end, and deliver the load while the aerial device stays in midair without having to land on the ground.

Patent Document 1: Japanese Unexamined Patent Application, Publication No. 2016-88675

Patent Document 2: PCT International Publication No. WO2017/78118

DISCLOSURE OF THE INVENTION

Problems to be Solved by the Invention

However, a winding machine includes a complicated mechanism and is significantly heavy, resulting in a decrease in the maximum payload of an aerial device equipped with the winding machine. In view of this, the present invention is intended to provide an aerial device, a load-lowering device, and a load transport method that are capable of lowering a load from an aerial device body staying in midair, the aerial device and the load-lowering device being relatively light in weight.

Means for Solving the Problems

An aspect of the present invention is directed to an unmanned aerial device including: an aerial device body capable of flying in an unmanned manner; and a load-lowering device mounted to the aerial device body and configured to lower a load from the aerial device body. The load-lowering device has a linear member holder for holding a linear member having one end portion connectable to the load, the linear member holder holding at least the other end portion of the linear member, and a speed limiting mechanism that limits a speed at which the linear member is pulled out of the linear member holder, under a weight of the load.

Another aspect of the present invention is directed to a load-lowering device mountable to an aerial device body capable of flying in an unmanned manner, and configured to lower a load from the aerial device body staying in midair. The load-lowering device includes: a linear member holder for holding a linear member having one end portion connectable to the load, the linear member holder holding at least the other end portion of the linear member; and a speed limiting mechanism that limits a speed at which the linear member is pulled out of the linear member holder, under a weight of the load.

A yet another aspect of the present invention is directed to a method of transporting a load using an unmanned aerial device including an aerial device body capable of flying in an unmanned manner. The method includes: lowering the load from the aerial device body staying in midair, and holding, by means of a linear member holder provided to the aerial device body, a linear member having one end portion connected to the load such that the linear member holder holds at least the other end portion of the linear member. The lowering the load includes limiting a speed at which the linear member is pulled out of the linear member holder, under a weight of the load.

Effects of the Invention

The present invention provides an aerial device, a load-lowering device, and a load transport method that are capable of lowering a load from an aerial device body staying in midair, the aerial device and the load-lowering device being relatively light in weight.

PREFERRED MODE FOR CARRYING OUT THE INVENTION

Figure 1:
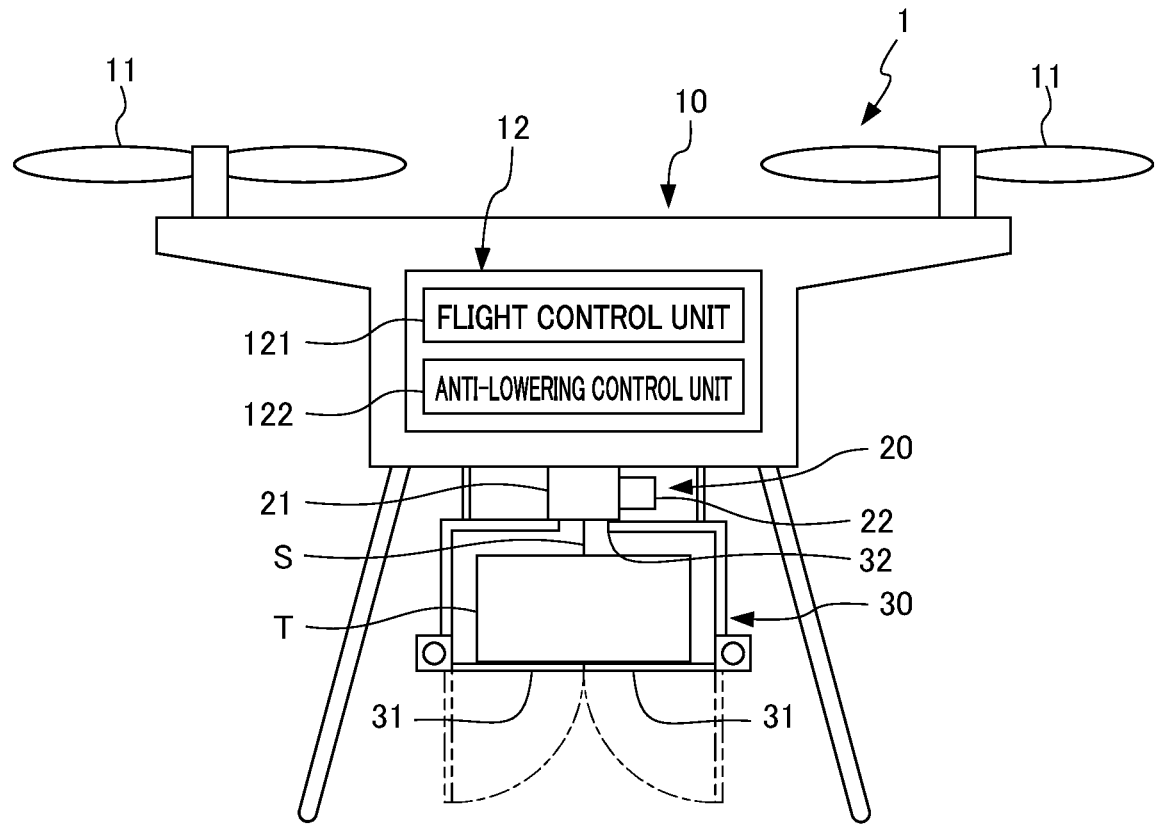
FIG. 1 is a schematic diagram illustrating a configuration of an unmanned aerial device according to a first embodiment of the present invention.

Embodiments of the present invention will be described with reference to the drawings. The following embodiments are non-limiting examples. FIG. 1 is a schematic diagram illustrating a configuration of an unmanned aerial device 1 according to a first embodiment of the present invention.

The unmanned aerial device 1 flies while holding a load T, and thereby transports the load T in an unmanned manner. The load T includes a cargo or a box and a cargo accommodated in the box.

The unmanned aerial device 1 includes an aerial device body 10 capable of flying in an unmanned manner, a load-lowering device 20 mounted to the aerial device body 10 and configured to lower the load T from the aerial device body, and an anti-lowering mechanism 30 configured to prevent the load T from being lowered. The load-lowering device 20 included in the unmanned aerial device 1 is, per se, an embodiment of the load-lowering device according to the present invention.

Although the aerial device body 10 is not particularly limited as long as it can fly in an unmanned manner, the aerial device body 10 of the present embodiment illustrated in the drawings is an unmanned rotary wing aircraft having a plurality of rotary wings 11. The aerial device body 10 has a control device 12 that controls the rotary wings 11 and the anti-lowering mechanism 30. Although not illustrated, the aerial device body 10 may further have, for example, various sensors for detecting a position, an altitude, an attitude, etc. of the aerial device body 10, a battery for supplying power to the components constituting the aerial device body 10, and a communication device for communicating with, for example, a base where management of the transport of the load T by the unmanned aerial device 1 is performed.

The control device 12 has a flight control unit 121 that controls, for example, the position, attitude, and flying speed of the aerial device body 10 by adjusting a rotational speed of the rotary wings 11, and an anti-lowering control unit 122 that switches the anti-lowering mechanism 30 between a state where the anti-lowering mechanism 30 holds the load T to prevent the load T from being lowered and a state where the anti-lowering mechanism 30 releases the load T to allow the load T to be lowered under its weight (by gravity).

Figure 2:
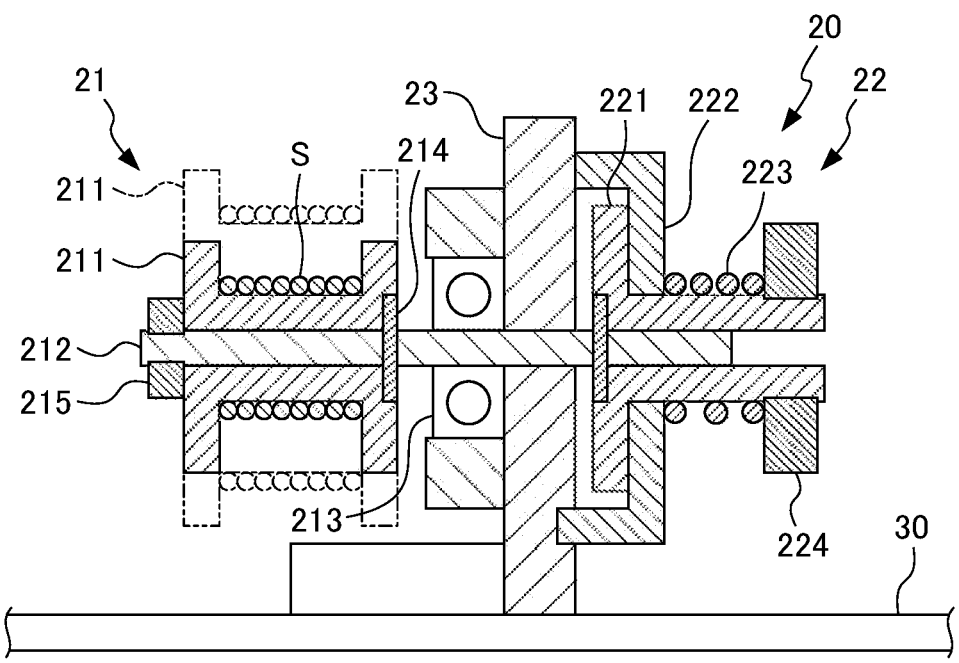
FIG. 2 is a schematic cross-sectional view illustrating a load-lowering device of the unmanned aerial device of FIG. 1.
Figure 3:
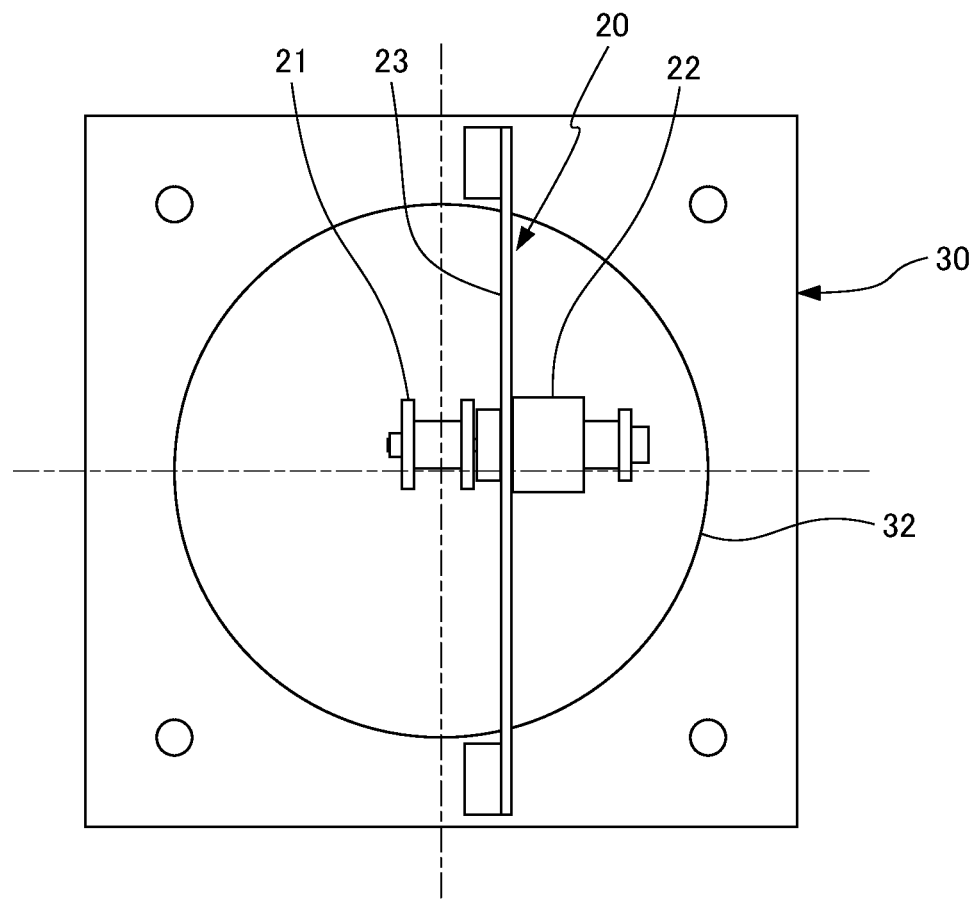
FIG. 3 is a schematic planar view illustrating the load-lowering device and an anti-lowering mechanism of the unmanned aerial device of FIG. 1.

The load-lowering device 20 lowers the load T onto a place for load delivery, such as the ground or a roof, from the aerial device body 10 staying in midair, using a linear member S having one end portion connected to the load T. The load-lowering device 20 has a linear member holder 21 that holds at least the other end portion of the linear member S, and a speed limiting mechanism 22 that limits a speed at which the linear member S is pulled out of the linear member holder 21, under the weight of the load T. As illustrated in FIGS. 2 and 3, the load-lowering device 20 can be supported on a support member 23 fixed to a top surface of the anti-lowering mechanism 30 coupled to the aerial device body 10. Accordingly, the unmanned aerial device 1 can be achieved by mounting a unit, into which the load-lowering device 20 and the anti-lowering mechanism 30 are integrated, to an existing aerial device body 10 and by adding the anti-lowering control unit 122 by way of rewriting of a control program of the control device 12.

Examples for use as the linear member S include flexible members such as a rope and a wire. The end portion of the linear member S may be tied to the load T, or may have a connecting member for connecting the load T to the end portion. The connecting member provided to the end portion of the linear member S may be, for example, a hook or a shackle. The connecting member may be fastened by means of a binding band with which a cargo or a box is bound, or a baler string. Alternatively, a cargo may be made connectable to the linear member S by being bound directly with a binding band or the like, without being accommodated in a box.

The linear member S is made to have a length greater than an estimated altitude at which the aerial device body 10 is expected to be at the time of lowering the load T (i.e., an estimated distance between the aerial device body 10 and the ground). With this feature, the load-lowering device 20 can continuously limit an acceleration due to gravity of the load T until the load T reaches the ground.

In a state where the anti-lowering mechanism 30 holds the load T, the linear member holder 21 exposes the one end portion of the linear member S in such a manner that the one end portion is not significantly slack between the linear member holder 21 and the load T, and holds the remaining portion of the linear member S closer to the other end, that is, the major portion of the linear member S. The linear member holder 21 of the present embodiment has a rotary shaft 212 to which a reel 211 having the linear member S wound therearound is detachably attached such that the reel 211 is prevented from making relative rotation. The rotary shaft 212 is rotatably supported on a bearing 213 attached to the support member 23. As illustrated in FIG. 3, the linear member holder 21 is preferably disposed eccentrically such that the linear member S suspended from the reel 211 is positioned at or as close as possible to a point right under the center of gravity of the unmanned aerial device 1.

As illustrated, an engagement pin 214 provided on the rotary shaft 212 and projecting in a radial direction may prevent the reel 211 from rotating relative to the rotary shaft 212. Alternatively, the rotation relative to the rotary shaft 212 may be prevented by another structure, such as a key or a spline. Further, the reel 211 is configured to prevent unintentional detachment from the rotary shaft 212 by means of a fixing nut 215 or the like.

The reel 211 is replaceable with a different reel 211 having a different diameter, which is indicated as an example by dot-dot-dash lines. In other words, the reel 211 includes a plurality of reels 211 having different diameters, and the linear member holder 21 may be configured to receive any one of the plurality of reels 211 attached thereto. With an increase in the diameter of the reel 211, a torque increases which is applied, via the linear member S, by gravity acting on the load T, and which acts to rotate the reel 211, and consequently, the rotary shaft 212. For this reason, the diameter of the reel 211 is selected according to the weight of the load T. Specifically, the heavier the load T is, the smaller the diameter of the reel 211 is suitably used, so that the intensity of the torque acting on the rotary shaft 212 due to the weight of the load is maintained within a certain range, thereby making it possible to reduce a variance in an acceleration of the load T.

Figure 4:
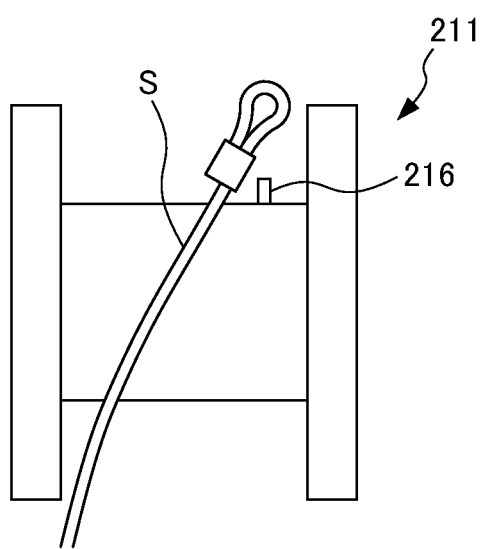
FIG. 4 is a schematic diagram illustrating a reel of a linear member holder of FIG. 2 and a retaining structure for retaining an end portion of a linear member.

Preferably, the reel 211 retains the other end portion of the linear member S while having the linear member S wound therearound, and releases the other end portion of the linear member S while having the linear member S unwound therefrom. For this reason, the reel 211 may have an engagement structure that prevents detachment of the linear member S when a tension in the other end portion of the linear member S acts in a circumferential direction of the reel 211, and that allows detachment of the linear member S when the tension in the linear member S acts in a radial direction of the reel 211. Specifically, a configuration illustrated in FIG. 4 is conceivable. That is, the reel 211 is provided with a retaining pin 216 projecting from a surface around which the linear member S is wound, and an end portion of the linear member S opposite to the load T is made to form a loop, through which the retaining pin 216 is inserted. With this configuration, in a state where the reel 211 has the linear member S wound therearound, the reel 211 retains the linear member S with the retaining pin 216. In a state where the linear member S has been pulled out of the linear member holder 21 while having the end portion remaining in the linear member holder 21, a tension in the end portion of the linear member S acts in a radial direction of the reel 211 so that the linear member S is detached from the retaining pin 216. Consequently, the entire linear member S can be pulled out of the linear member holder 21.

The speed limiting mechanism 22 can be configured to provide rotational resistance to the rotary shaft 212. As illustrated in FIG. 2, the speed limiting mechanism 22 of the present embodiment has a rotor 221 that is rotatable together with the rotary shaft 212, a stator 222 that is not rotatable, and a spring 223 that generates a frictional force by bringing the rotor 221 and the stator 222 into pressure contact with each other (in the present embodiment, by pressing the rotor 221 against the stator 222). The speed limiting mechanism 22 of the present embodiment further has an adjustment member 224 for adjusting an elastic force of the spring 223. The rotor 221 may be integrated with the reel 211. In this case, the speed limiting mechanism 22 is configured to provide rotational resistance to the reel 211.

The speed limiting mechanism 22 is set such that a static torque applied to the rotary shaft 212 by a maximum static frictional force acting between the rotor 221 and the stator 222 when the rotary shaft 212 is not rotated becomes smaller than a torque that is applied by the weight of the load T and that acts to rotate the reel 211. The speed limiting mechanism 22 reduces an acceleration of the rotary shaft 212 when the anti-lowering mechanism 30 allows the load T to be lowered. That is, the speed limiting mechanism 22 reduces an acceleration of the load T by a certain acceleration equivalent to a dynamic frictional force acting between the rotor 221 and the stator 222.

The speed limiting mechanism 22 is configured to passively reduce an increase in a descending speed at which the load T is lowered, by means of the frictional force. Therefore, unlike a winding machine that can wind a linear member S, the speed limiting mechanism 22 does not require a motor or a mechanism for preventing entanglement of the linear member S. As a result, the load-lowering device 20 is light in weight, enabling the unmanned aerial device 1 to transport a greater weight of the load T. The speed limiting mechanism 22 does not need to be controlled, enabling the unmanned aerial device 1 to have a simple configuration.

Limiting the speed of the load T reaching the ground to about 1 m/sec usually allows the load T to be placed on the ground without being damaged. The aerial device body 10 is configured to stay at a certain altitude at the time of lowering the load T. Specifically, the aerial device body 10 is preferably configured to stay at an altitude where it cannot be touched by a person, for example, at an altitude of 3 m or higher and 5 m or lower. Thus, while the altitude of the aerial device body 10 at the time of lowering the load T is taken into consideration, the above-described selection of the reel 211 or/and setting of the elastic force of the spring 223 is/are implemented according to the weight of the load T. In this way, the descending speed of the load T can be maintained substantially constant.

The anti-lowering mechanism 30 is configured to prevent the load T from being lowered by directly holding the load T. The anti-lowering mechanism 30 of the present embodiment can have movable supports 31 that are switchable between a state where the movable supports 31 prevent the load T from being lowered and a state where the movable supports 31 allows the load T to be lowered. Further, the anti-lowering mechanism 30 may have a peripheral wall or a cover functioning as a windbreak for reducing a wind force received by the load T. The anti-lowering mechanism 30 may be formed into a box having an openable bottom constituted by the movable supports 31. In this case, the linear member S extending from the load-lowering device 20 passes through an opening 32 (see FIGS. 1 and 3) formed in the top surface of the anti-lowering mechanism 30.

The movable supports 31 are configured to support a bottom of the load T. The movable supports 31 may be configured to restrict lateral movement of the load T by contacting with side surfaces of the load T, or may also function as a member that grasps and immobilizes the load T during flight.

It is conceivable that a plurality of anti-lowering mechanisms 30 of different sizes are provided, and one of them is selected according to the size of the load T and mounted to the aerial device body 10. Further, the anti-lowering mechanism 30 may be configured such that the movable supports 31 are exchangeable according to the size of the load T. With this configuration, the load T is inhibited from being displaced with respect to the aerial device body 10 during flight of the unmanned aerial device 1, thereby enabling stabilization of the flight of the unmanned aerial device 1.

The anti-lowering mechanism 30 is controlled by the anti-lowering control unit 122 based on the altitude of the aerial device body 10. Specifically, when the aerial device body 10 has descended to a predetermined altitude above a place for delivering the load T, the anti-lowering control unit 122 causes the anti-lowering mechanism 30 to open the movable supports 31, thereby readying the anti-lowering mechanism 30 to allow the load T to be lowered.

Figure 5:
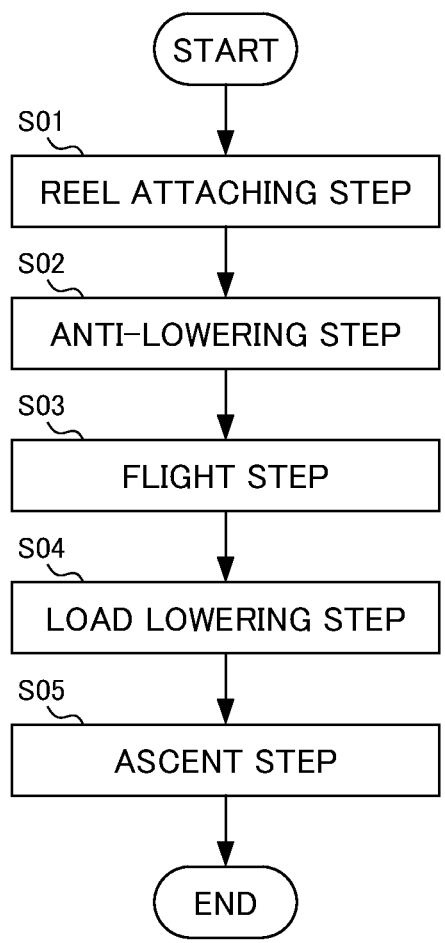
FIG. 5 is a flowchart illustrating a process for controlling the unmanned aerial device of FIG. 1.

FIG. 5 illustrates a process according to a method of transporting the load T using the unmanned aerial device 1, as an embodiment of the transport method of the present invention. The transport method of the present embodiment includes a step of connecting the load T to one end portion of the linear member S (Step S1: load connecting step), a step of holding the linear member S by means of the linear member holder 21 (Step S2: reel attaching step), a step of preventing the load T from being lowered, by means of the anti-lowering mechanism 30 (Step S3: anti-lowering step), a step of causing the unmanned aerial device 1 holding the load T to fly to airspace above a place for delivering the load T (Step S4: flight step), a step of causing the anti-lowering mechanism 30 to allow the load T to be lowered so that the load is lowered at a speed limited by the load-lowering device 20 (Step S5: load lowering step), and a step of causing the aerial device body 10 to ascend such that the linear member S is pulled out to be entirely removed from the linear member holder 21 (Step S6: ascent step).

In Step S1 as the load connecting step, a reel diameter is selected according to the weight of the load T to be transported, the linear member S is wound around the reel 211 having the selected diameter, and the load T is connected to a free end of the linear member. Selecting the diameter of the reel 211 according to the weight of the load T makes it possible to adjust a degree of limitation imposed by the speed limiting mechanism 22 on a speed at which the linear member S is pulled out. To improve workability in the load connecting step, the plurality of reels 211 having different diameters may be on standby while each reel has a linear member S wound therearound in advance.

In Step S2 as the reel attaching step, a region of the linear member S except for the end portion adjacent to the load T is held by the linear member holder 21. Specifically, the reel 211 having the linear member S wound therearound is attached to the rotary shaft 212.

In Step 33 as the anti-lowering step, the anti-lowering mechanism 30 closes the movable supports 31 to support the load T, thereby preventing the load T from being lowered.

In Step S4 as the flight step, the flight control unit 121 controls the rotary wings 11 so that the unmanned aerial device 1 flies to be positioned at a predetermined altitude above the place for delivering the load T.

In Step S5 as the load lowering step, the anti-lowering mechanism 30 opens the movable supports 31 to allow the load T to be lowered by gravity, and the load-lowering device 20 lowers the load T while limiting the descending speed.

In Step S6 as the ascent step, after lapse of a predetermined time that starts from the opening of the movable supports 31 by the anti-lowering mechanism 30 and that is long enough for the load T to reach the ground, the flight control unit 121 causes the aerial device body 10 to ascend substantially vertically, so that the linear member S is pulled out to be entirely removed from the linear member holder 21. In this way, the unmanned aerial device 1 can completely separate the load T, and can move.

As described above, the unmanned aerial device 1 includes the load-lowering device 20 that limits the descending speed of the load T without using a motor. Accordingly, although being capable of lowering the load T onto a place for load delivery from the aerial device body 10 staying in midair, the unmanned aerial device 1 is relatively light in weight, and therefore, can transport the load T that is relatively heavy.

Figure 6:
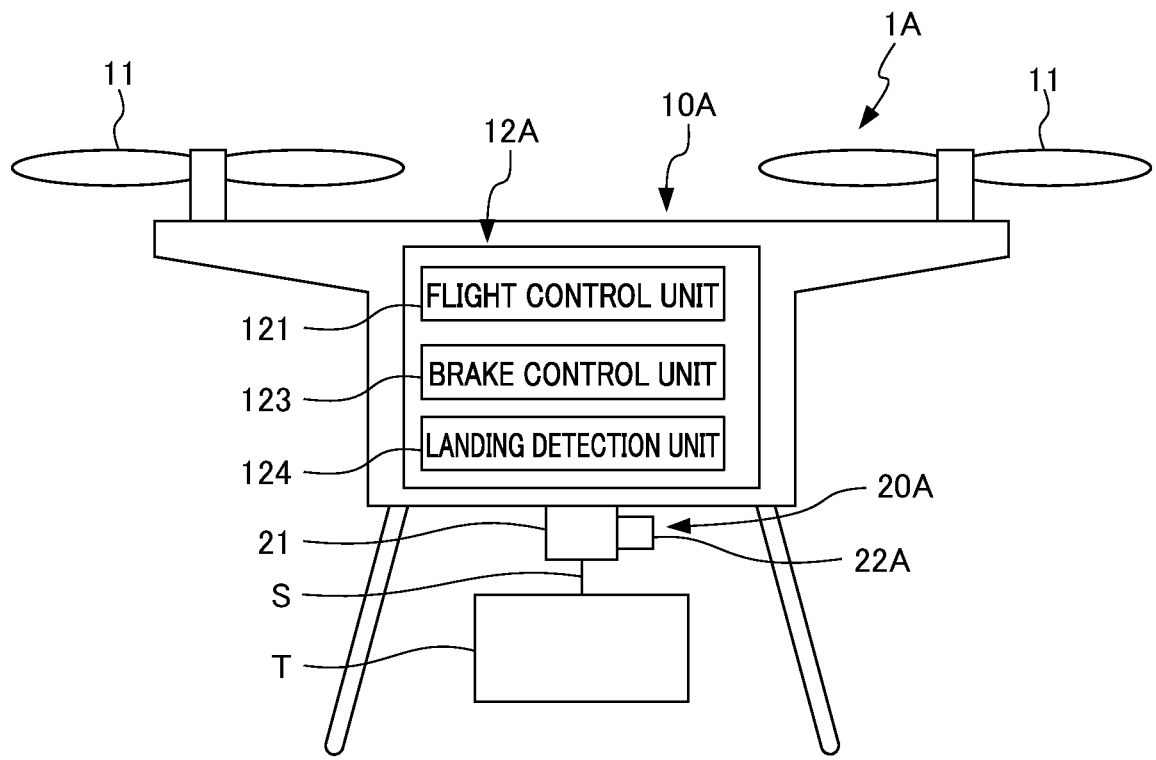
FIG. 6 is a schematic diagram illustrating a configuration of an unmanned aerial device according to a second embodiment of the present invention.

Next, reference is made to FIG. 6 illustrating an unmanned aerial device 1A according to a second embodiment of the present invention. In the following description of the unmanned aerial device 1A illustrated in FIG. 6, the same components as those of the unmanned aerial device 1 illustrated in FIG. 1 will be denoted by the same reference characters, and a redundant description will be omitted.

The unmanned aerial device 1A includes an aerial device body 10A capable of flying in an unmanned manner, and a load-lowering device 20A mounted to the aerial device body 10A and configured to lower a load T from the aerial device body. The load-lowering device 20A included in the unmanned aerial device 1A is, per se, an embodiment of the load-lowering device according to the present invention.

The aerial device body 10A of the present embodiment has a plurality of rotary wings 11 and a control device 12A that controls the rotary wings 11 and the load-lowering device 20A.

The control device 12A has a flight control unit 121 that controls, for example, a position, an attitude, and a flying speed of the aerial device body 10A by adjusting a rotational speed of the rotary wings 11, and a brake control unit 123 that controls the load-lowering device 20A, and a landing detection unit 124 that detects landing of the load T.

Figure 7:
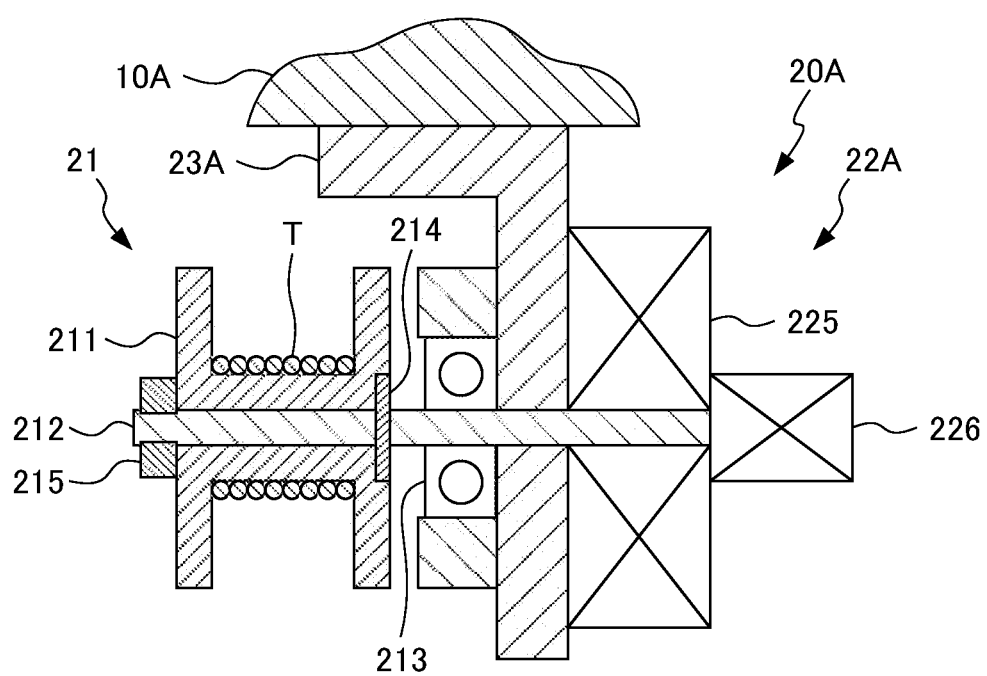
FIG. 7 is a schematic cross-sectional view illustrating a load-lowering device of the unmanned aerial device of FIG. 5.

The load-lowering device 20A has a linear member holder 21 that holds at least the other end portion of a linear member S, and a speed limiting mechanism 22A that limits a speed at which the linear member S is pulled out of the linear member holder 21, under a weight of the load T. As illustrated in FIG. 7, the load-lowering device 20A can be supported on a support member 23A fixed to the aerial device body 10A.

The speed limiting mechanism 22A has an electromagnetic brake 225 that is capable of stopping rotation of a rotary shaft 212 by resisting a rotational torque applied by the weight of the load T, and an encoder 226 that detects an amount of rotation of the rotary shaft 212. The electromagnetic brake 225 exerts a braking force to prevent the load T from being lowered during flight of the aerial device body 10A. When the load T is to be lowered, the brake control unit 123 controls the braking force of the electromagnetic brake 225. That is, the electromagnetic brake 225 of the present embodiment also functions as an anti-lowering mechanism for preventing the load T from being lowered. From the viewpoint of saving power consumption, it is preferable to configure the electromagnetic brake 225 to generate a braking torque by means of a spring force at the time of power cut, and to eliminate the braking force when an electric current passes through. As illustrated, the electromagnetic brake 225 is arranged to provide rotational resistance to the rotary shaft 212. Alternatively, the electromagnetic brake 225 may be arranged to provide rotational resistance to a reel 211.

The brake control unit 123 preferably controls the braking force of the electromagnetic brake 225 according to at least one of an altitude of the aerial device body 10A, a rate of rotation of the rotary shaft 212, and a descending speed of the load T, and a position (altitude) of the load T. The rate of rotation of the rotary shaft 212 and the descending speed of the load T can be calculated based on a value detected by the encoder 226. The position of the load T can be calculated based on the altitude of the aerial device body 10A and a value detected by the encoder 226. In either case of the foregoing controls, the descending speed at least at a moment when the load T reaches the ground can be limited to a certain value or lower. Consequently, the load T can be prevented from being damaged.

The encoder 226 can also be used when the landing detection unit 124 detects landing of the load T. Specifically, the landing detection unit 124 determines that the load T has landed if the rotary shaft 212 stops rotating after the start of the control of lowering of the load T by the brake control unit 123.

The load-lowering device 20A of the present embodiment is also capable of safely lowering the load T onto the ground from the aerial device body 10A staying in midair, and is lighter in weight than a winding machine for raising a load T by winding a linear member. Accordingly, the unmanned aerial device 1A can transport the load T that is relatively heavy.

Figure 8:
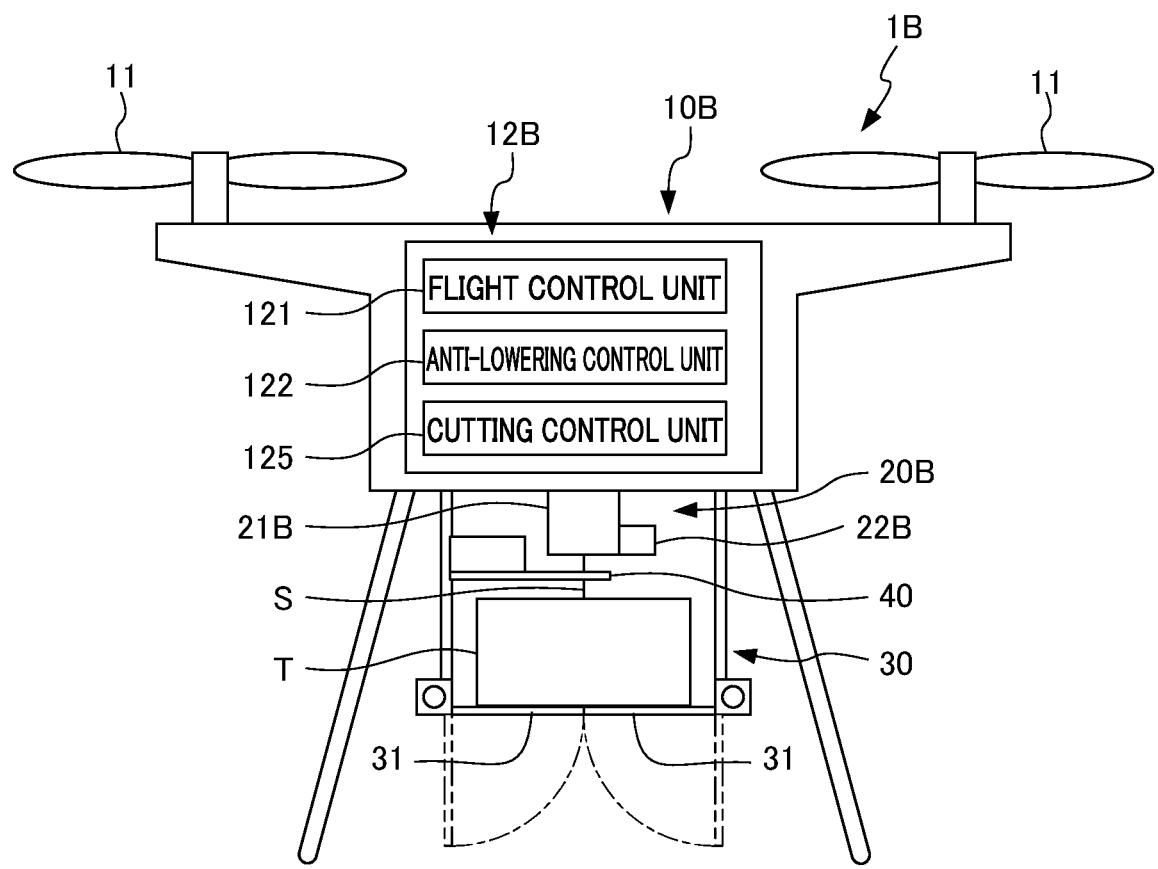
FIG. 8 is a schematic diagram illustrating a configuration of an unmanned aerial device according to a third embodiment of the present invention.

Next, reference is made to FIG. 8 illustrating an unmanned aerial device 1B according to a third embodiment of the present invention. In the following description of the unmanned aerial device 1B illustrated in FIG. 8, the same components as those of the unmanned aerial device 1 illustrated in FIG. 1 will be denoted by the same reference characters, and a redundant description will be omitted.

The unmanned aerial device 1B includes an aerial device body 10B capable of flying in an unmanned manner, a load-lowering device 20B mounted to the aerial device body 10B and configured to lower a load T from the aerial device body, an anti-lowering mechanism 30 configured to prevent the load T from being lowered, and a cutting mechanism 40 configured to cut off a linear member S. The load-lowering device 20B included in the unmanned aerial device 1B is, per se, an embodiment of the load-lowering device according to the present invention.

The aerial device body 10B of the present embodiment has a plurality of rotary wings 11 and a control device 12B that controls the rotary wings 11 and the load-lowering device 20B.

The control device 12B has a flight control unit 121 that controls, for example, a position, an attitude, and a flying speed of the aerial device body 10B by adjusting a rotational speed of the rotary wings 11, an anti-lowering control unit 122 that controls the anti-lowering mechanism 30, and a cutting control unit 125 that controls the cutting mechanism 40.

The load-lowering device 20B has a linear member holder 21B that holds at least the other end portion of the linear member S, and a speed limiting mechanism 22B that limits a speed at which the linear member S is pulled out of the linear member holder 21B, under a weight of the load T.

Figure 9:
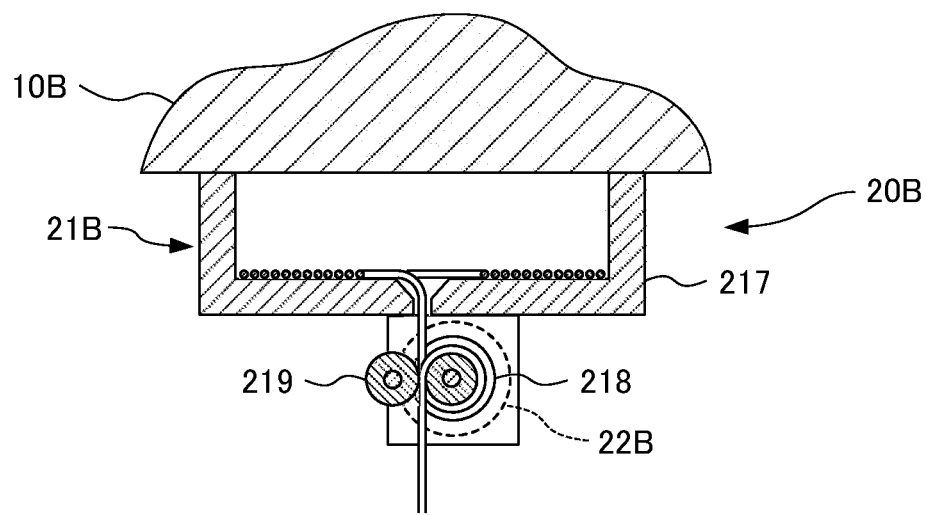
FIG. 9 is a schematic cross-sectional view illustrating a load-lowering device of the unmanned aerial device of FIG. 7.

As illustrated in FIG. 9, the linear member holder 21B has a housing 217 in which the linear member S is housed, a guide roller 218 around which the linear member S extending from the housing 217 is wound to extend downward, and a pressing roller 219 that presses the linear member S against the guide roller 218. The speed limiting mechanism 22B is arranged to apply a frictional force to the guide roller 218 or the pressing roller 219.

The load-lowering device 20B of the present embodiment is also capable of safely lowering the load T onto the ground from the aerial device body 10B staying in midair, and is lighter in weight than a winding machine for raising a load T by winding a linear member. Accordingly, the unmanned aerial device 1B can transport the load T that is relatively heavy.

The cutting mechanism 40 is controlled by the cutting control unit 125, and cuts off the linear member S after landing of the load T and before ascent of the aerial device body. This feature eliminates the need to provide a new linear member S in the linear member holder 21B every time the load T is delivered. The timing when the linear member S is cut off is not limited to the above example. For example, the linear member S may be cut off when the load T is descending (before the load T lands).

As can be seen clearly from the foregoing description, the present invention has the following features that exert respective advantageous effects.

The unmanned aerial device (1, 1A, 1B) according to one embodiment of the present invention includes: the aerial device body (10, 10A,10B) capable of flying in an unmanned manner; and the load-lowering device (20) mounted to the aerial device body (10, 10A, 10B) and configured to lower a load (T) from the aerial device body (10, 10A, 10B). The load-lowering device (20) has the linear member holder (21) for holding the linear member (S) having one end portion connectable to the load (T), the linear member holder (21) holding at least the other end portion of the linear member (S), and the speed limiting mechanism (22) that limits a speed at which the linear member (S) is pulled out of the linear member holder (21), under a weight of the load (T). This feature makes it possible to configure the load-lowering device (20) capable of lowering the load (T) at a safe speed onto the ground to have a relatively small weight, thereby enabling transport of the load (T) that is relatively heavy.

In the unmanned aerial device (1, 1A) according to one embodiment of the present invention, the linear member holder (21, 21A) has a rotary shaft (212) to which a reel (211) having the linear member (S) wound therearound is attached, and the speed limiting mechanism (22, 22A) provides rotational resistance to the rotary shaft (212) or the reel (211). This feature enables the linear member holder (21, 21B) to have a relatively simple configuration and a small weight.

In the unmanned aerial device (1) according to one embodiment of the present invention, the speed limiting mechanism (22) has a rotor (221) that is rotatable together with the rotary shaft (212), a stator (222) that is not rotatable, and a spring (223) that generates a frictional force by bringing the rotor (221) and the stator (222) into pressure contact with each other. This configuration eliminates the need to control the speed limiting mechanism (22) and the need to supply a drive force to the speed limiting mechanism (22).

In the unmanned aerial device (1A) according to one embodiment of the present invention, the speed limiting mechanism (22A) has an electromagnetic brake (225). This feature makes it easy to adjust the descending speed of the load (T).

The unmanned aerial device (1A) according to one embodiment of the present invention has a brake control unit (123) that controls a braking force of the electromagnetic brake (225) according to at least one of an altitude of the aerial device body (10A), a rate of rotation of the rotary shaft (212), and the descending speed of the load (T), and a position of the load (T). This feature makes it possible to adjust the descending speed of the load (T) easily and accurately.

In the unmanned aerial device (1, 1A) according to one embodiment of the present invention, the reel (211) is detachably attachable to the rotary shaft (212) and includes a plurality of reels (211) having different diameters, and the linear member holder (21) is capable of receiving any one of the plurality of reels (211) that is attached thereto. This feature makes it possible to adjust an intensity of a torque acting on the rotary shaft (212) and applied by the weight of the load (T), thereby enabling adjustment of the descending speed of the load (T).

In the unmanned aerial device (1, 1A) according to one embodiment of the present invention, the reel (211) retains the other end portion of the linear member (S) while having the linear member (S) wound therearound, and releases the other end portion of the linear member (S) while having the linear member (S) unwound therefrom. This feature makes it possible to easily separate the load (T) from the aerial device body (10).

The unmanned aerial device (1B) according to one embodiment of the present invention further includes a cutting mechanism (40) configured to cut off the linear member (S). This feature also makes it possible to easily separate the load (T) from the aerial device body (10B).

The unmanned aerial device (1, 1B) according to one embodiment of the present invention further includes an anti-lowering mechanism (30) configured to prevent the load (T) from being lowered. This feature makes it possible to prevent unintentional dropping of the load (T) during flight of the unmanned aerial device (1, 1B).

The unmanned aerial device (1, 1B) according to one embodiment of the present invention has an anti-lowering control unit (122) that controls the anti-lowering mechanism (30) based on the altitude of the aerial device body (10, 10B). This feature makes it possible to suitably lower the load (T) by means of the linear member (S).

The unmanned aerial device (1A) according to one embodiment of the present invention has a landing detection unit (124) that detects landing of the load (T), and a flight control unit (121) that causes the aerial device body (10A) to ascend after the landing detection unit (124) detects landing of the load (T). This feature makes it possible to separate the linear member (S).

The load-lowering device (20) according to one embodiment of the present invention is mountable to an aerial device body (10, 10A, 10B) capable of flying in an unmanned manner, and is configured to lower the load (T) from the aerial device body (10, 10A, 10B) staying in midair. The load-lowering device (20) has the linear member holder (21) for holding the linear member (S) having one end portion connectable to the load (T), the linear member holder (21) holding at least the other end portion of the linear member (S), and the speed limiting mechanism (22) that limits a speed at which the linear member (S) is pulled out of the linear member holder (21), under a weight of the load (T). This feature makes it possible to achieve the unmanned aerial device (1, 1A, 1B) that is relatively light in weight and is capable of lowering the load (T) without having to land on the ground.

The load transport method according to one embodiment of the present invention is a method of transporting the load (T) using the unmanned aerial device (1, 1A, 1B) including the aerial device body (10, 10A, 10B) capable of flying in an unmanned manner. The method includes lowering the load (T) from the aerial device body (10, 10A, 10B) staying in midair, and holding, by means of the linear member holder (21) provided to the aerial device body (10, 10A, 10B), the linear member (S) having one end portion connected to the load (T) such that the linear member holder (21) holds at least the other end portion of the linear member (S). The lowering of the load (T) includes limiting a speed at which the linear member (S) is pulled out of the linear member holder (21), under the weight of the load (T). This method makes it possible to use the unmanned aerial device (1, 1A, 1B) that is relatively light in weight.

According to the load transport method of one embodiment of the present invention, the linear member holder (21) has the rotary shaft (212) to which the reel (211) having the linear member (S) wound therearound is attached, the speed at which the linear member (S) is pulled out is limited by providing rotational resistance to the rotary shaft (212) or the reel (211), and a diameter of the reel (211) is selected according to the weight of the load (T). This feature makes it possible to adjust a degree of limitation imposed on the speed at which the linear member is pulled out, and to achieve a suitable descending speed of the load (T) irrespective of the weight of the load (T).

In the foregoing, three embodiments of the present invention have been described. It should be noted that the above-described embodiments are not intended to limit the present invention, and the present invention encompasses modifications and improvements made within the range where the object of the present invention is achieved.

The speed limiting mechanism of the load-lowering device according to the present invention may include a motor for applying, to the rotary shaft of the reel around which the linear member is wound, a torque that inhibits the linear member from being pulled out. In this case, the maximum torque of the motor may be smaller than a torque applied to the load by gravity. Therefore, a relatively small motor in comparison with that of a winding machine for winding a linear member can be used as the motor of the speed limiting mechanism.

The speed limiting mechanism of the unmanned aerial device of the present invention may be a governor that generates an axial displacement using a centrifugal force generated by the rotation of the rotary shaft, and adjusts a frictional force using the axial displacement.

The anti-lowering mechanism of the load-lowering device of the present invention may be, for example, a latch mechanism configured to stop the rotation of the rotary shaft of the linear member holder.

The load-lowering device of the unmanned aerial device according to the above-described first and second embodiments may be provided with a guide (e.g., a pulley or a ring) for guiding the linear member such that the linear member is suspended right under the center of gravity of the unmanned aerial device, irrespective of the diameter of the reel. This feature makes it possible to position, in planar view, the center of gravity of the load-lowering device at the center of the gravity of the unmanned aerial device, thereby improving balance of the unmanned aerial device.

EXPLANATION OF REFERENCE NUMERALS 1, 1A, 1B: Unmanned Aerial Device
10, 10A, 10B: Aerial Device Body
11: Rotary Wing
12, 12A, 12B: Control Device
121: Flight Control Unit
122: Anti-Lowering Control Unit
123: Brake Control Unit
124: Landing Detection Unit
125: Cutting Control Unit
20, 20A, 20B: Load-Lowering Device
21, 21B: Linear Member Holder
211: Reel
212: Rotary Shaft
213: Bearing
214: Engagement Pin
215: Fixing Nut
216: Retaining Pin
217: Housing
218: Guide Roller
219: Pressing Roller
22, 22A, 22B: Speed Limiting Mechanism
221: Rotor
222: Stator
223: Spring
224: Adjustment Member
225: Electromagnetic Brake
226: Encoder
23, 23A: Support Member
30: Anti-Lowering Mechanism
31: Movable Support
32: Opening
40: Cutting Mechanism
S: Linear Member
T: Load

The invention claimed is:
1. An unmanned aerial device comprising:
an aerial device body capable of flying while unmanned; and
a load-lowering device mounted to the aerial device body and configured to lower
a load from the aerial device body,
wherein the load-lowering device has:
a linear member holder for holding a linear member having one end portion connectable to the load, the linear member holder holding at least an other end portion of the linear member, wherein the linear member holder includes a rotary shaft with a reel attached, wherein the linear member is wound around the reel;

a speed limiting mechanism that limits a speed at which the linear member is pulled out of the linear member holder, under a weight of the load, wherein the speed limiting mechanism provides rotational resistance to the rotary shaft or the reel, wherein the speed limiting mechanism has a rotor that is rotatable together with the rotary shaft, a stator that is not rotatable, and a spring that generates a frictional force by bringing the rotor and the stator into pressure contact with each other, and wherein a static torque applied by the spring to the rotary shaft by a maximum static frictional force acting between the rotor and the stator when the rotary shaft is not rotated becomes smaller than a torque that is applied by the weight of the load and that acts to rotate the reel; and a landing detection unit that detects that the load has landed based on the rotary shaft ceasing rotation after the load-lowering device has begun lowering the load.

2. The unmanned aerial device according to claim 1, wherein
the speed limiting mechanism has an electromagnetic brake.

3. The unmanned aerial device according to claim 2, further comprising:
a brake control unit that controls a braking force of the electromagnetic brake according to at least one of an altitude of the aerial device body, a rate of rotation of the rotary shaft, and a descending speed of the load, and a position of the load.

4. The unmanned aerial device according to claim 1, wherein
the reel is detachably attachable to the rotary shaft and comprises a plurality of reels having different diameters, and
the linear member holder is capable of receiving any one of the plurality of reels attached to the rotary shaft.

5. The unmanned aerial device according to claim 1, wherein
the reel retains the other end portion of the linear member while having the linear member wound around the reel, and releases the other end portion of the linear member while having the linear member unwound from the reel.

6. The unmanned aerial device according claim 1, further comprising:
a cutting mechanism configured to cut off the linear member.

7. The unmanned aerial device according to claim 1, further comprising:
an anti-lowering mechanism configured to prevent lowering of the load.

8. The unmanned aerial device according to claim 7, further comprising:
an anti-lowering control unit that controls the anti-lowering mechanism based on an altitude of the aerial device body.

9. The unmanned aerial device according to claim 1, further comprising:
a flight control unit that causes the aerial device body to ascend after the landing detection unit detects landing of the load.

10. A load-lowering device mountable to an aerial device body capable of flying while unmanned, and configured to lower a load from the aerial device body staying in midair, the load-lowering device comprising:

a linear member holder for holding a linear member having one end portion connectable to the load, the linear member holder holding at least an other end portion of the linear member, wherein the linear member holder includes a rotary shaft with a reel attached, wherein the linear member is wound around the reel;

a speed limiting mechanism that limits a speed at which the linear member is pulled out of the linear member holder, under a weight of the load, wherein the speed limiting mechanism provides rotational resistance to the rotary shaft or the reel, wherein the speed limiting mechanism has a rotor that is rotatable together with the rotary shaft, a stator that is not rotatable, and a spring that generates a frictional force by bringing the rotor and the stator into pressure contact with each other, and wherein a static torque applied by the spring to the rotary shaft by a maximum static frictional force acting between the rotor and the stator when the rotary shaft is not rotated becomes smaller than a torque that is applied by the weight of the load and that acts to rotate the reel; and a landing detection unit that detects that the load has landed based on the rotary shaft ceasing rotation after the load-lowering device has begun lowering the load.

11. A method of transporting a load using an unmanned aerial device including an aerial device body capable of flying while unmanned, the method comprising:

lowering the load from the aerial device body staying in midair, and holding, by means of a linear member holder provided to the aerial device body, a linear member having one end portion connected to the load such that the linear member holder holds at least an other end portion of the linear member, wherein the linear member holder includes a rotary shaft with a reel attached, wherein the linear member is wound around the reel, wherein the lowering the load includes limiting a speed at which the linear member is pulled out of the linear member holder, under a weight of the load using a speed limiting mechanism, wherein the speed limiting mechanism provides rotational resistance to the rotary shaft or the reel, wherein the speed limiting mechanism has a rotor that is rotatable together with the rotary shaft, a stator that is not rotatable, and a spring that generates a frictional force by bringing the rotor and the stator into pressure contact with each other, and wherein a static torque applied by the spring to the rotary shaft by a maximum static frictional force acting between the rotor and the stator when the rotary shaft is not rotated becomes smaller than a torque that is applied by the weight of the load and that acts to rotate the reel; and detecting that the load has landed based on the rotary shaft ceasing rotation after the load-lowering device has begun lowering the load.

* * * * *